United States Patent [19]

Douty et al.

[11] Patent Number: 5,518,424
[45] Date of Patent: May 21, 1996

[54] CONNECTOR FOR A BATTERY

[75] Inventors: George H. Douty, Mifflintown; David A. Griesemer; John P. Huss, Jr., both of Harrisburg; John M. Landis, Camp Hill; Michael D. Long, Hershey; Earl W. McCleerey; Charles E. Reynolds, both of Mechanicsburg; Michael E. Shirk, Grantville; Charles H. Weidler, Lancaster, all of Pa.

[73] Assignee: The Whitaker Corporation, Wilmington, Del.

[21] Appl. No.: 310,891

[22] Filed: Sep. 22, 1994

Related U.S. Application Data

[63] Continuation of Ser. No. 35,817, Mar. 23, 1993, abandoned.

[51] Int. Cl.⁶ ............................................ H01R 17/00
[52] U.S. Cl. ........................ 439/660; 439/500; 439/928
[58] Field of Search .................................. 439/660, 928, 439/861, 862, 842, 928.1, 500

[56] References Cited

U.S. PATENT DOCUMENTS

| | | | |
|---|---|---|---|
| 3,268,849 | 8/1966 | Silverberg | 439/660 |
| 3,348,116 | 10/1967 | Freeman et al. | 439/929 |
| 3,728,664 | 4/1973 | Hurst | 339/91 R |
| 4,101,818 | 7/1978 | Kelly, III et al. | 320/2 |
| 4,141,616 | 2/1979 | Gottlieb | 339/75 M |
| 4,214,197 | 7/1980 | Mann et al. | 320/2 |
| 4,303,876 | 12/1981 | Kelly, III et al. | 320/2 |
| 4,578,628 | 3/1986 | Siwiak | 320/2 |
| 4,629,962 | 12/1986 | Arakawa | 320/2 |
| 4,636,703 | 1/1987 | Tohya et al. | 320/2 |
| 4,670,701 | 6/1987 | Sako | 320/2 |
| 4,680,527 | 7/1987 | Benenati et al. | 320/2 |
| 4,816,735 | 3/1989 | Cook et al. | 320/2 |
| 4,873,479 | 10/1989 | Iimura et al. | 320/2 |
| 4,907,987 | 3/1990 | Douty et al. | 439/571 |
| 4,963,812 | 10/1990 | Mischenko et al. | 320/2 |
| 5,004,434 | 4/1991 | Aiello et al. | 439/636 |
| 5,007,859 | 4/1991 | Sangregory et al. | 439/500 |
| 5,028,859 | 7/1991 | Johnson et al. | 320/15 |
| 5,035,024 | 7/1991 | Steiner et al. | 320/2 |
| 5,039,929 | 8/1991 | Veistroffer et al. | 320/2 |
| 5,052,943 | 10/1991 | Davis | 439/357 |
| 5,059,885 | 10/1991 | Weiss et al. | 439/929 |
| 5,065,082 | 11/1991 | Fushiya | 320/2 |
| 5,122,721 | 6/1992 | Okada et al. | 320/2 |
| 5,148,094 | 9/1992 | Parks et al. | 320/2 |
| 5,157,318 | 10/1992 | Wang | 320/2 |
| 5,158,468 | 10/1992 | Curtis et al. | 439/76 |
| 5,162,719 | 11/1992 | Tomura et al. | 320/2 |
| 5,187,422 | 2/1993 | Izenbaard et al. | 320/2 |
| 5,220,270 | 6/1993 | Peickert | 320/2 |
| 5,245,266 | 9/1993 | Yuen | 320/2 |
| 5,256,955 | 10/1993 | Tomura et al. | 320/2 |

FOREIGN PATENT DOCUMENTS

0535975A1  7/1993  European Pat. Off. ........ H01R 13/24

*Primary Examiner*—David L. Pirlot

[57] ABSTRACT

An electrical connector (1) for a battery (2) comprises, electrical battery terminals (5, 6, 7, 8), a first pair of the terminals (5, 8) connecting battery cells (4) electrically in series, a second pair of the terminals (6, 7) comprising data and charging terminals, an insulating package 3 containing the cells 4 and at least a part (14) of a charging control circuit, and accessible portions (18) of the terminals (5, 6, 7, 8) being accessible through an end (19) of the package (3) and also through a side (20) of the package (3), whereby the end (19) and the side (20) of the package (3) are adapted to matingly engage another, mating electrical connector (24).

38 Claims, 9 Drawing Sheets

CONNECTOR FOR A BATTERY

This application is a Continuation of application Ser. No. 08/035,817 filed Mar. 23, 1993, now abandoned.

FIELD OF THE INVENTION

The invention pertains to an electrical connector for a battery, and more particularly, to an electrical connector for connection of a rechargeable battery to a circuit board of electronic equipment.

BACKGROUND OF THE INVENTION

Batteries are used to power portable electronic equipment for consumer and business use, such as, video cameras, cellular telephones and computers. Reducing the weight of a battery would desirably lighten the equipment. For example, a battery presently comprises thirty percent of the weight of a portable computer. To reduce the weight and the size of the battery would result in more frequent battery replacement, or more frequent recharging of a spent battery. A new generation of smaller, lighter batteries is being developed, batteries having charging circuits inside the batteries themselves. The charging circuits are electronically controlled to charge quickly, and to shut off when full charge is approached. A connector for a rechargeable battery would provide electrical connections for discharging the battery, and separate electrical connections for a charging control circuit that is inside the battery.

SUMMARY OF THE INVENTION

A feature of the invention resides in a connector that includes battery terminals and a package containing the terminals and further containing battery cells, electrical interconnections for the cells and a charging control circuit.

Another feature of the invention resides in a connector for a battery that includes battery terminals accessible through an end and a side of a package containing the battery, the terminals being protected by the end and the side of the package.

An electrical connector for a battery according to the invention comprises, first and second pairs of electrical battery terminals, the first pair connected in electrical series with multiple cells of a battery, the second pair being connected, respectively, to a positive terminal and a charging control circuit inside the battery, a package containing the terminals and the cells and the charging control circuit, and accessible portions of the terminals being accessible through an end of the package and also through a side of the package, whereby the end and the side of the package are adapted to matingly engage another, mating electrical connector.

DESCRIPTION OF THE DRAWINGS

Embodiments of the invention will now be described by way of example with reference to the drawings, according to which.

DETAILED DESCRIPTION

Figure 1:
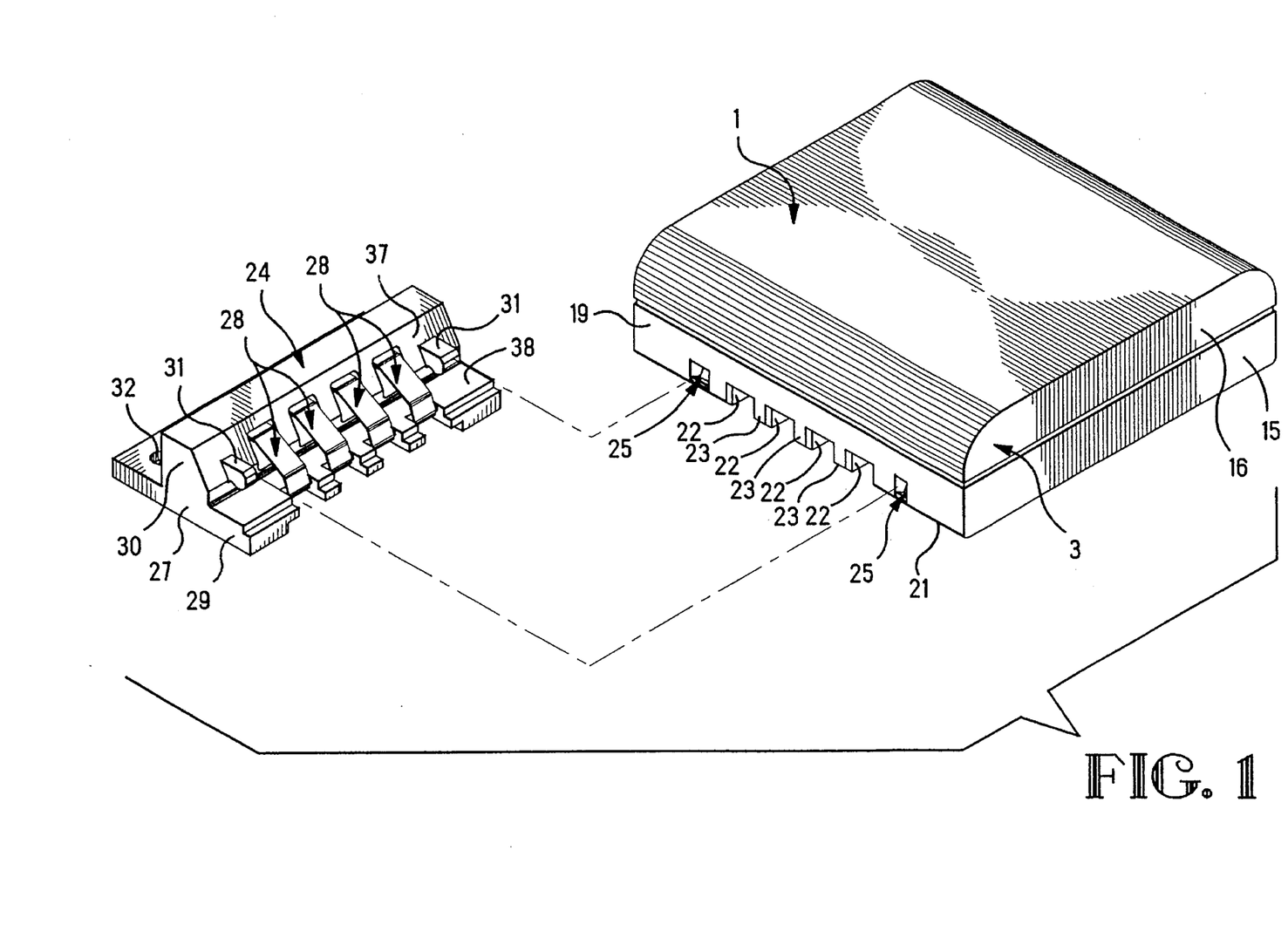
FIG. 1 is a perspective view of a connector for a rechargeable battery together with another, mating connector.
Figure 2:
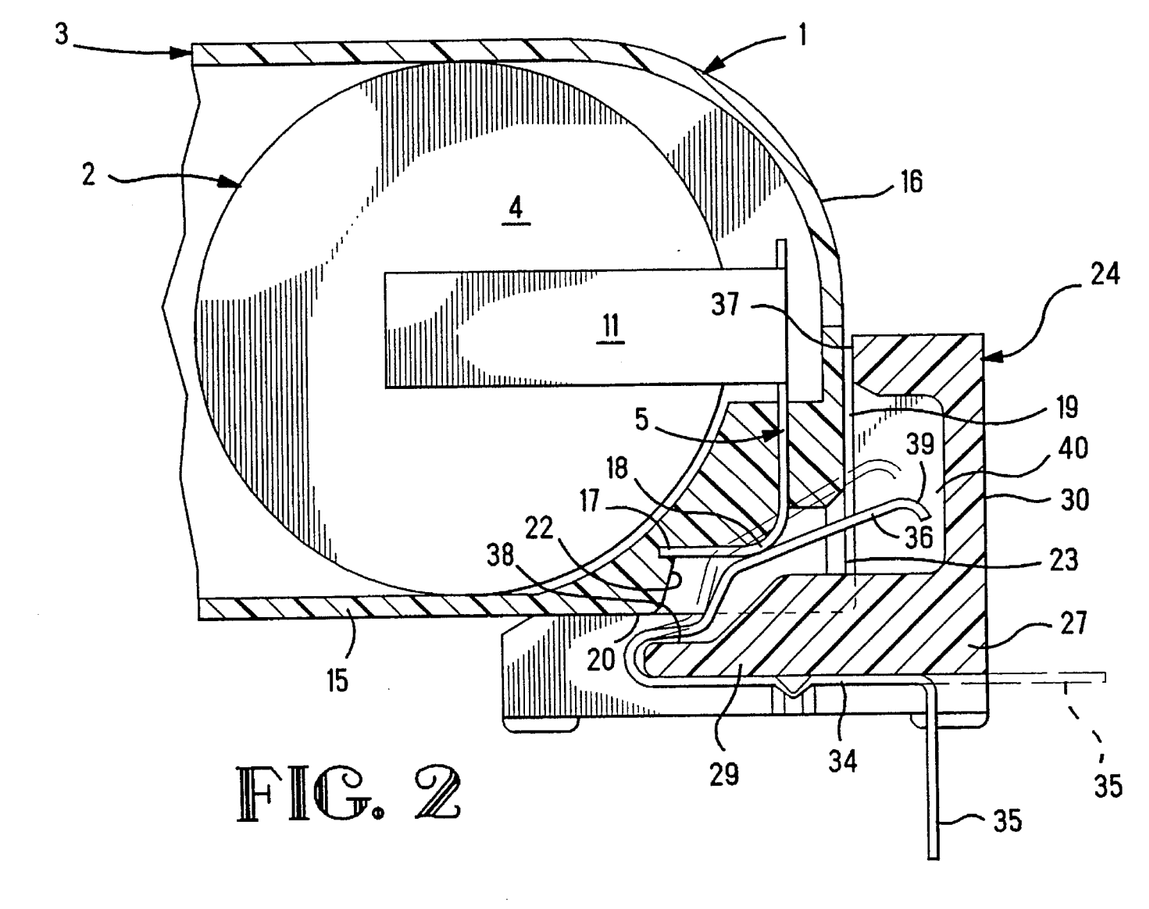
FIG. 2 is a fragmentary view in section of the battery connector in mating connection with the other, mating connector.
Figure 4:
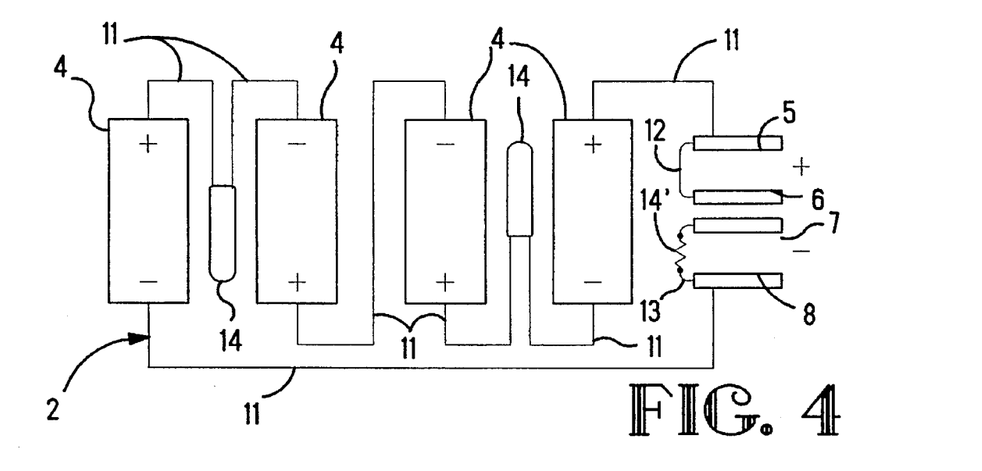
FIG. 4 is a schematic view depicting interconnection of the battery cells with electrical terminals of the connector for a rechargeable battery.
Figure 10:
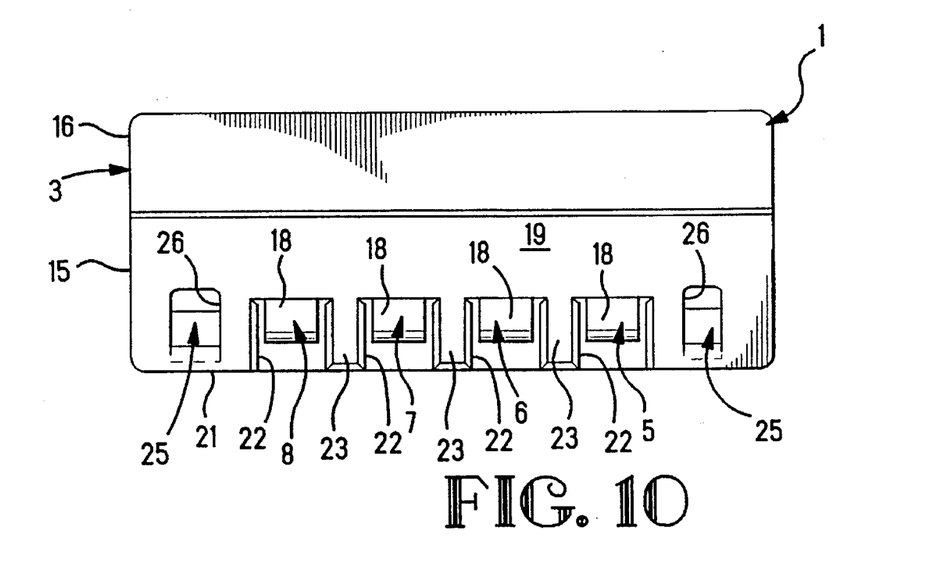
FIG. 10 is an end view of the battery connector as shown in FIG. 1.

With reference to FIGS. 1, 2 and 10, an electrical connector 1 for a battery 2, FIGS. 2 and 4, comprises, an insulating package 3 containing multiple cells 4 of the battery 2, and a row of four battery terminals 5, 6, 7, and 8. A first set comprises the positive polarity terminal 5, and the negative polarity terminal 8, of the battery 2. The terminals 5 and 8 are at opposite ends of the row of terminals 5, 6, 7 and 8. A second set comprises a data terminal 6 and a charging terminal 7, respectively. The data terminal 6 is for connection of electronic data to an electronic charging control circuit, not shown. The charging terminal 7 is for connection of a thermistor controlled, charging transformer, not shown.

Figure 3:
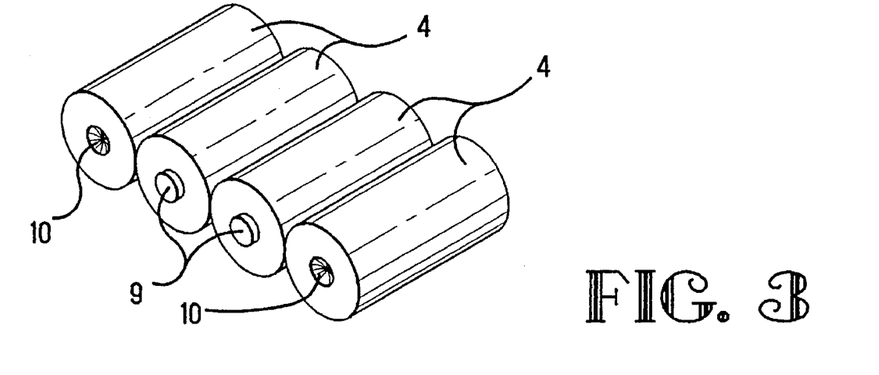
FIG. 3 is perspective view of multiple battery cells.

With reference to FIGS. 3 and 4, a group of the cells 4 are positioned for being contained in the package 3. The cells 4 each are of known, dry cell, construction. The cells 4 are capable of being recharged by a thermistor controlled, charging transformer, not shown. Each cell 4 provides 1.5 Volts, and includes a positive polarity, cell terminal 9, at one end, and a negative polarity, cell terminal 10 at another end.

With reference to FIGS. 3 and 4, the interconnections of the cells 4 and the terminals 5, 6, 7 and 8, inside the package, will be described. The group of cells 4 are connected electrically in series, as depicted in FIG. 4. Metal strips, 11 represented schematically in FIG. 4, and one of which strips 11 being depicted in FIG. 2, comprise interconnections of the cells 4 electrically in series. The strips 11 are joined, for example, by soldering or welding, to connect to the respective cells 4. The metal strips 11 further are similarly joined to the two terminals 5, 8, at positive and negative polarities, respectively, to connect the terminals 5, 8 to the cells for discharging the battery.

As shown in FIG. 4, another metal strip 12 interconnects the data terminal 6 to the positive polarity terminal 5. Another metal strip 13 interconnects a thermistor 14' in electrical series with the charging terminal 7 to the negative polarity terminal 8. The metal strips 11 further join and interconnect one or more thermostats 14 in electrical series with the cells 4. Each thermostat 14 and the thermistor 14' comprise, part of an electronically controlled charging circuit for recharging the cells 4.

With reference to FIGS. 1, 2 and 10, the package 3 is of two piece construction, having a base 15 and a cover 16, fabricated by molding a suitable plastics material. The base 15 and the cover 16 are fused or adhesively joined together. The battery terminals 5, 6, 7, 8 are fabricated from metal strip. Each of the terminals 5, 6, 7, 8 extends from inside the package 3, through the base 15, and toward an exterior of the package 3. A free end 17, FIG. 2, of each of the terminals 5, 6, 7, 8 is embedded in the base 15 of the package 3. The terminals 5, 6, 7, 8 are embedded in the base 15 of the package 3 by injection molding.

With reference to FIGS. 2 and 10, an accessible portion 18 of each of the battery terminals 5, 6, 7, 8 faces toward an end 19 of the package 3, and is obversely curved to face toward a bottom side 20 of the package 3, as well. Each accessible portion 18 is accessible through the end 19 of the package 3 and also through the side 20 of the package 3. The end 19 and the side 20 of the package 3 intersect along the base 15 at an intersection 21, FIGS. 1 and 10. At the intersection 21 of the end 19 and the side 20, the end 19 and the side 20 of the package 3 are recessed for access to the accessible portions 18 of the battery terminals 5, 6, 7, 8. More specifically, a series of recesses 22 are in the intersection 21. The accessible portions 18 of the battery terminals 5, 6, 7, 8 are within respective recesses 22, and are recessed from the exterior surface of the package 3. The intersection 21 form ribs 23, FIG. 1, between the battery terminals 5, 6, 7, 8, separating the accessible portions 18 of the battery terminals 5, 6, 7, 8, one from another. The accessible portions 18 of the battery terminals 5, 6, 7, 8 are recessed from exterior surfaces of the ribs 23. Accordingly, the end 19 and the side 20 of the package protect the battery terminals 5, 6, 7, 8 from being touched accidentally, while the battery 4 is being carried about.

Figure 9:
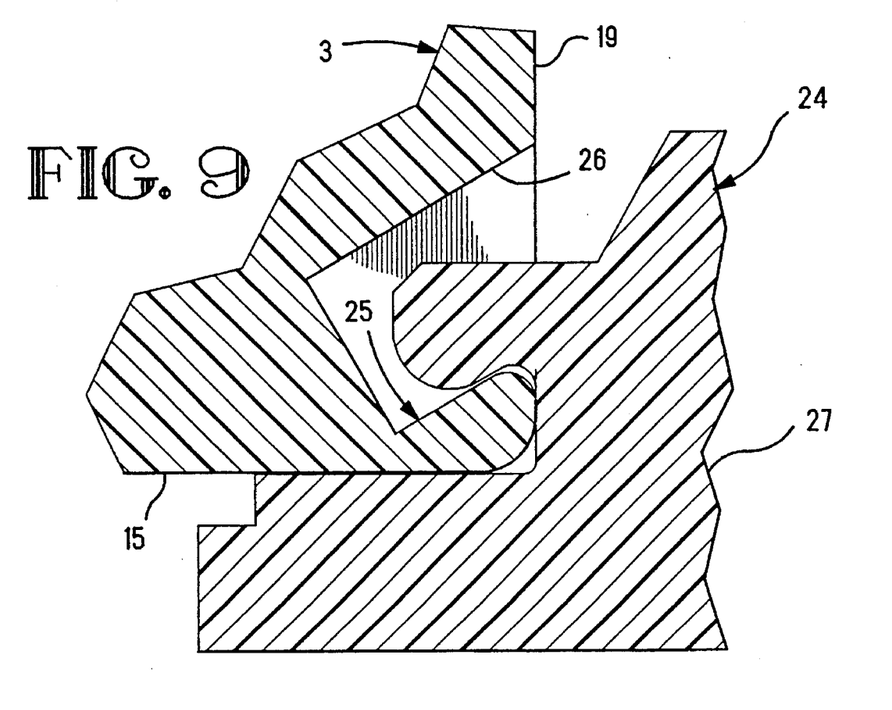
FIG. 9 is an enlarged fragmentary view in section of a coupling for mated connection of the connectors as shown in FIG. 2.

The end 19 and the side 20 of the package 3 are both adapted to matingly engage another, mating electrical connector 24, FIGS. 1 and 2. A hook shaped coupling 25, FIG. 9, is divided into two portions, FIGS. 1 and 10, at opposite ends of the row of battery terminals 5, 6, 7, 8. The two portions of the hook shaped coupling 25 are inside respective recesses 26 in the end 19 of the package 3. The recesses 26 are of different widths and are spaced apart a known distance, to distinguish the package 3 from another, incompatible packages 3 having a different spacing or sizes for the recesses 26.

Figure 5:
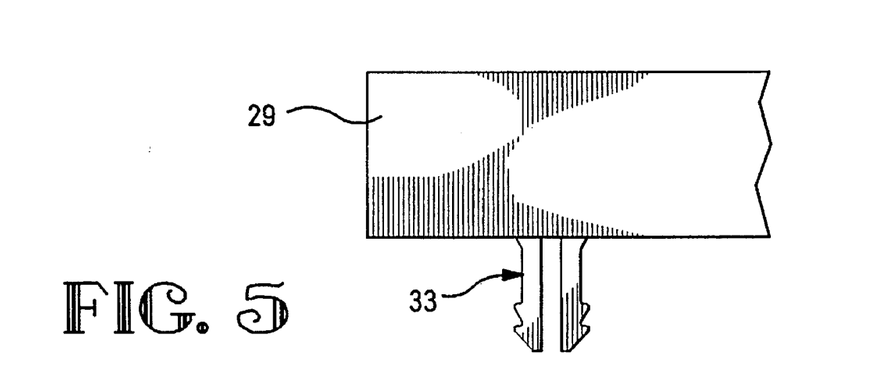
FIG. 5 is a fragmentary elevation view of a board lock for the mating connector as shown in FIG. 1.

With reference to FIGS. 1, 2 and 6–10, the mating electrical connector 24 comprises, a unitary, one piece, insulating housing block 27 and two pairs of conductive electrical contacts 28. The housing block 27 comprises, a base 29 for mounting on a circuit board, not shown, a side wall 30 extending from the base 29, and projecting end barriers 31 extending outward with respect to the side wall 30, and extending upward with respect to the base 29. The base 29 is mounted to a circuit board by fasteners, not shown, through fastener receiving openings, one shown in FIG. 1 at 32, in a part of the base 29 that extends past the side wall 30. In place of the opening 32, FIG. 5 depicts a split, board lock 33, depending from the base 29, with a construction and for a purpose as disclosed in U.S. Pat. No. 4,907,987.

Figure 6:
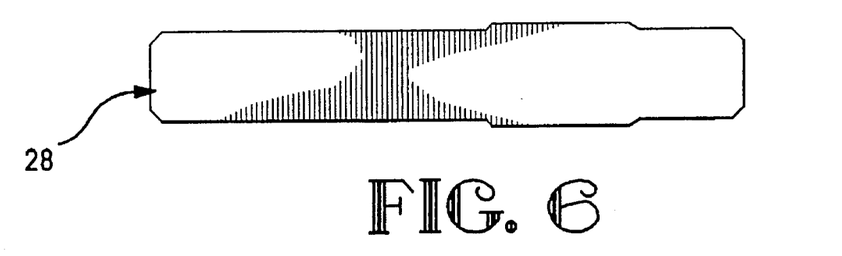
FIG. 6 is a plan view of an electrical contact in the form of a metal blank.

Each of the contacts 28 is formed from a generally rectangular metal strip, shown in flat blank form in FIG. 6. Each contact 28 is bent from the flat blank form to the form shown in FIG. 7. Each contact 28 includes a straight base portion 34 adjacent a free end 35 that is bent downward to form an electrical terminal for plugged connection in a circuit board, not shown. In FIG. 2, the free end 35 of the contact 28 may extend straight out from the base portion 34 of the contact 28, as indicated in broken lines, to provide an electrical terminal extending beyond the side wall 30; in which case, the base 29 of the housing block 27 is shortened to end at the side wall 30.

Figure 7:
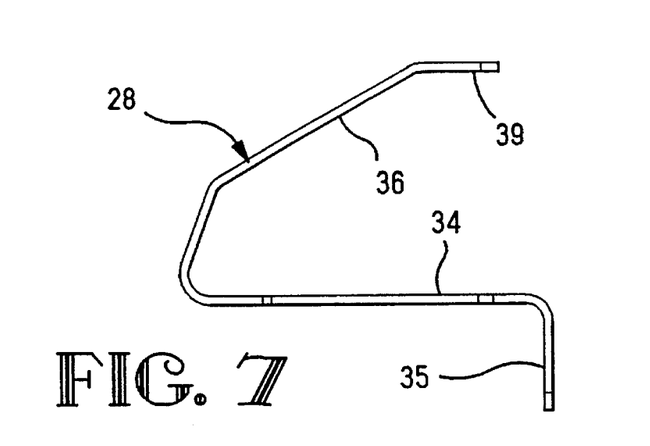
FIG. 7 is a side view of an electrical contact formed from the metal blank form.
Figure 8:
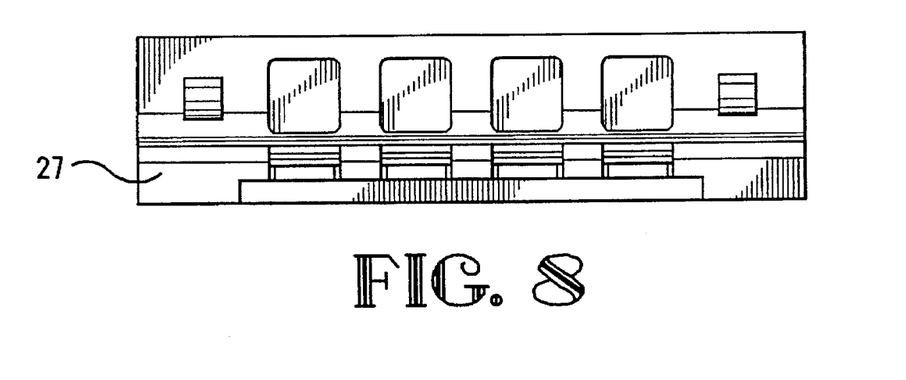
FIG. 8 is an end view of the mating connector as shown in FIG. 1.

With reference to FIGS. 2 and 7, each contact 28 is bent back on itself to form an inclined, resiliently delectable portion 36 extending from the base portion 34. The base portion 34 of each contact 28 impinges against the base 29 of the housing block 27. The deflectable portion 36 of each contact 28 extends from the base 29 of the housing block 27 toward an open top 37 of the housing block 27, and toward an open side 38 of the housing block 27. With reference to FIGS. 2 and 7, an adjacent, free end 39 of each contact 28 is protected from accidentally being struck, by extending inside a cavity 40 in the side wall 30 of the housing block 27. Sufficient clearance inside the cavity 40 is present to allow for deflection of the contact 28 by wiping pressure connection with a corresponding one of the battery terminals 5, 6, 7, 8. The amount of deflection is depicted by comparing the position of the contact 28 with the previous position shown in broken lines in FIG. 2. The contacts 28 are accessible through both the open top 37 and the open side 38 of the housing block 27, for mating engagement with respective terminals 5, 6, 7, 8.

The end barriers 31 are at opposite ends of a row of the contacts 28, and comprise a coupling part. The barriers 31 are hook shaped, FIG. 9, to couple onto the hook shaped coupling 28 that is recessed in the package 3. The barriers 31 are at least slightly taller than the contacts 28, and serve to protect the contacts 28 from being struck accidentally. The size of the end barriers 31, and the spacing between the end barriers 31, are adapted for matching with the coupling 25 on the package 3. The barriers 31 have different widths for plugging into the recesses 26 of different widths, that are in the end 19 of the package 3. The barriers 31 would be unable to couple with a coupling 25 of different size and spacing comprising, for example, a different, incompatible package 3. Further, the recesses of different widths may vary to distinguish different connectors 1, and the recesses of all the different connectors 1 may mate with a charging circuit, not shown. For the battery connector 1 to uncouple from the mating connector 24, the package 3 is pivoted clockwise from its position shown in FIG. 9, which unhooks the coupling 25 from the barriers 31, and allows withdrawal of the barriers 31 along the recesses 26. To matingly connect the battery connector 1 with the mating connector 24, an opposite procedure is followed, in that the package 3 is inserted along the barriers 31, and is pivoted counter clockwise (anticlockwise) to couple together the coupling 25 and the barriers 31.

The package 3 matingly engages the mating connector 24 by movement of the package 3 in two directions of motion, either by movement of the end 19 of the package 3 into the open side 38 of the mating connector 24, or by movement of the bottom side 20 of the package 3 into the open top 37 of the mating connector 24 and toward the base 29 of the mating connector 24. Following such movement, the package 3 is pivoted, as described previously, to couple the coupling 25 with the hook shaped barriers 31. The package 3 matingly connects with the mating connector 24, when the end 19 of the package and the side wall 30 of the mating connector 24 overlap, and when the bottom side 20 of the package 3 covers and seats against the base 29 of the mating connector 24. A tactile feel and audible snap results by movement of the package 3 in an endwise direction, such that the hook shaped coupling 25 resiliently deflects slightly to pass beyond the barriers 31 and to recover resiliently and quickly from its deflection accompanied by an audible snap and tactile feel, indicating a coupling function has been accomplished, according to FIG. 9.

Figure 11:
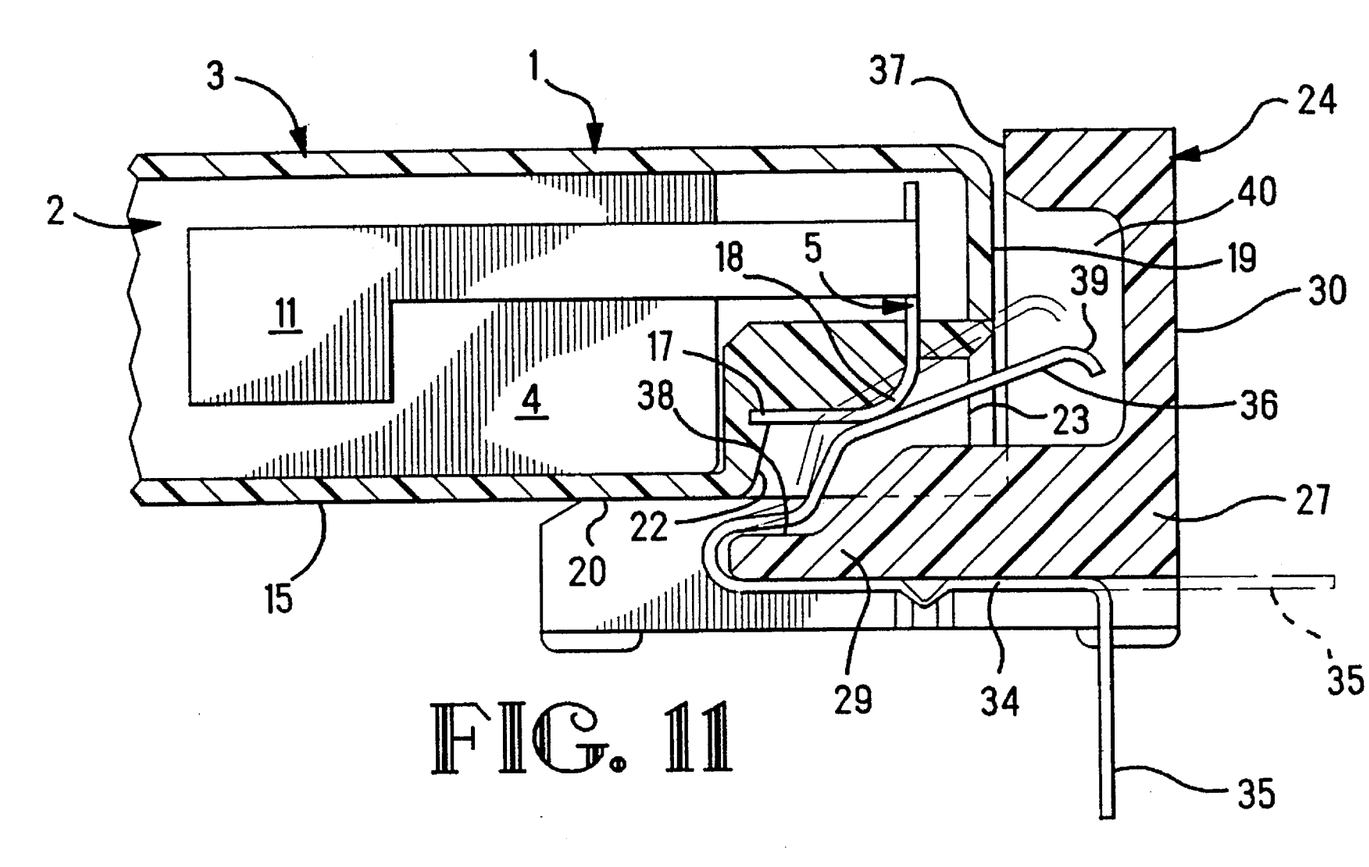
FIG. 11 is a fragmentary view in section of another battery connector in mated connection with the mating connector as shown in FIG. 1.

The housing block 27 is adapted with the open top 37, so as to mate and connect with a package 3 having an end 19 of varied height, for example, a package 3 depicted in FIG. 11 has an end 19 of lesser height, which is adapted for mating connection with the same connector 24.

Figure 12:
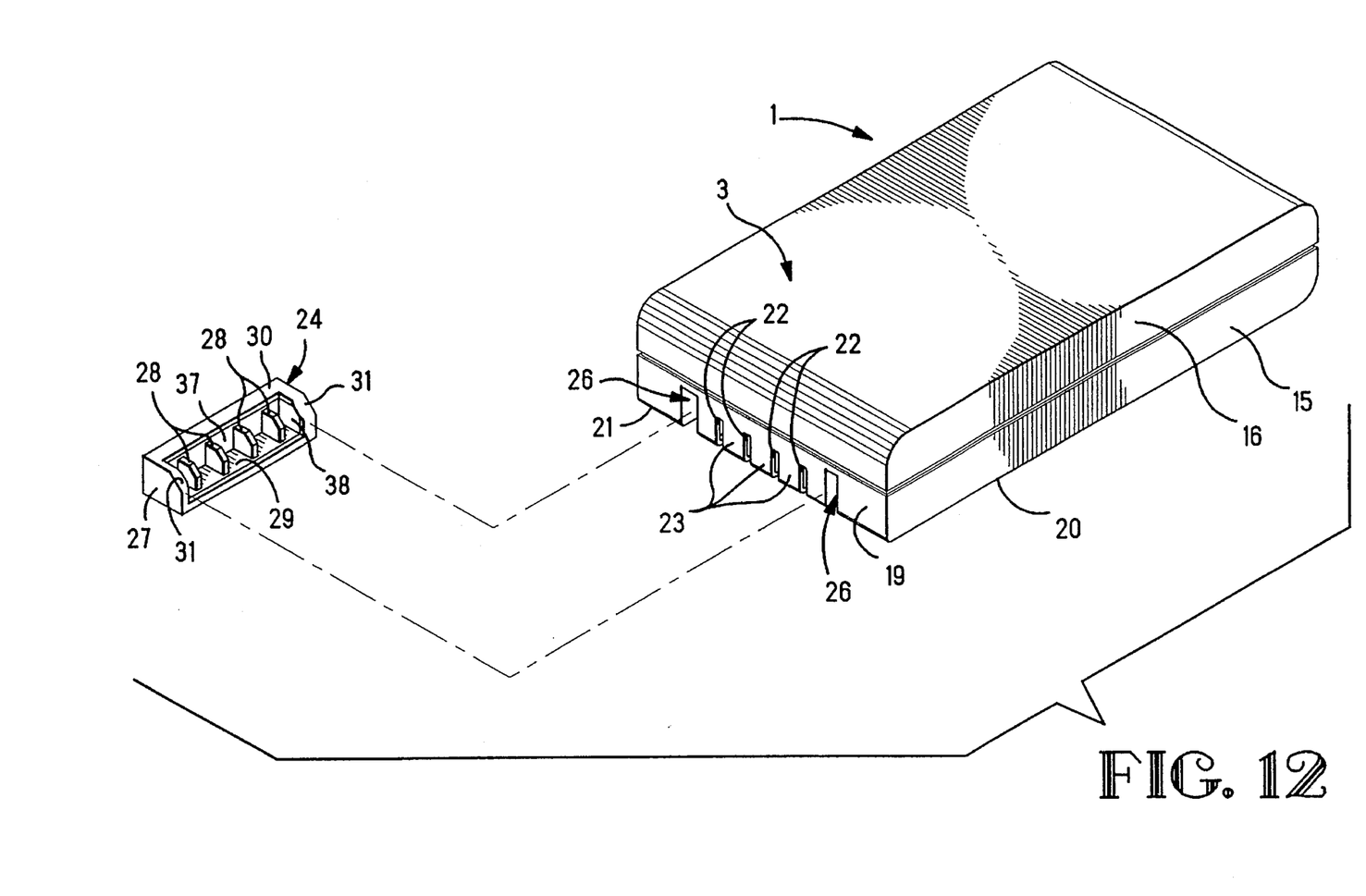
FIG. 12 is a perspective view similar to FIG. 1 of another connector for a rechargeable battery, and a mating connector.
Figure 13:
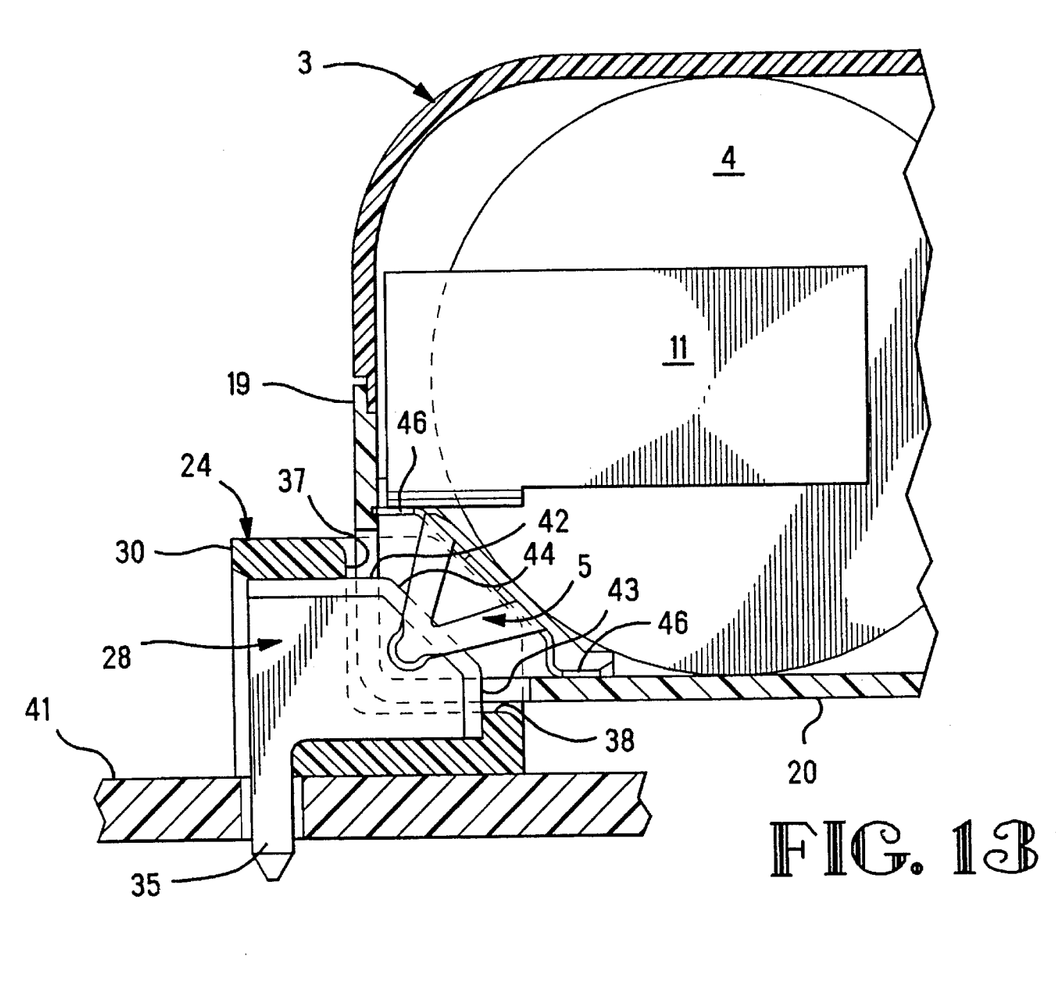
FIG. 13 is a view similar to FIG. 2 of the battery connector shown in FIG. 12 in mating connection with the mating connector shown in FIG. 12.

With reference to FIGS. 12 and 13, another embodiment of the mating connector 24 will be described. The connector 24, FIGS. 12 and 13, is similar to the connector 24, FIG. 1, in that the same reference numerals designate similar parts of construction. The mating connector 24 of FIGS. 12 and 13, is fabricated with the following differences in construction. The electrical contacts 28 mounted in the housing block 27 are metal blades having depending terminals 35 in the form of posts for mounting to a circuit board 41. The blades have top edges 42 facing an open top 37 of the housing block 27, and side edges 43 facing an open side 38 of the housing block 27. The blades have chamfered edges 44 at the corners of the top edges 42 and the side edges 43. The barriers 31, FIG. 12, without a hook shaped coupling, are of different widths, and are adapted to be matingly received in recesses 26 of different widths in a modified package 3, as disclosed in FIG. 12. The recesses 26 extend through the intersection of the end 19 and the bottom side 20 of the package 3. The coupling 25 is absent from the modified package 3 of FIG. 12.

Figure 14:
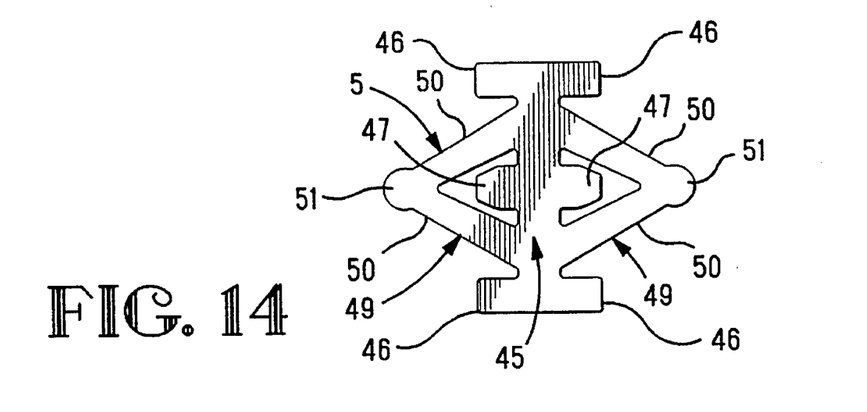
FIG. 14 is a plan view of a battery terminal in the form of a metal blank.
Figure 15:
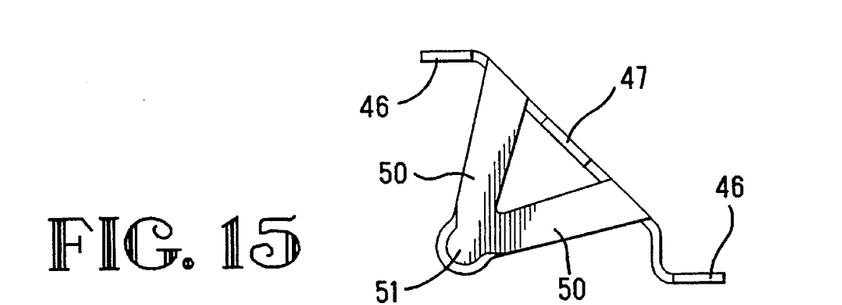
FIG. 15 is a side view of a battery terminal formed from the metal blank shown in FIG. 14.

With reference to FIGS. 12 and 13, further details of the modified package 3 are disclosed. The battery terminal 5, as well as all the other battery terminals, not shown, is stamped and formed from a metal strip having a blank form as shown in FIG. 14. Each blank has a central spine 45 and a series of ribs 46, 47 extending in opposite directions from the spine 45. The ribs 46, 47 engage the insulative material of the package 3, and thereby, mount and stabilize the terminal 5 in one of the recesses 22. One of the ribs 46 is joined by welding or by solder to a metal strip 11, FIG. 13, that interconnects the cells 4 of the battery 3.

Figure 16:
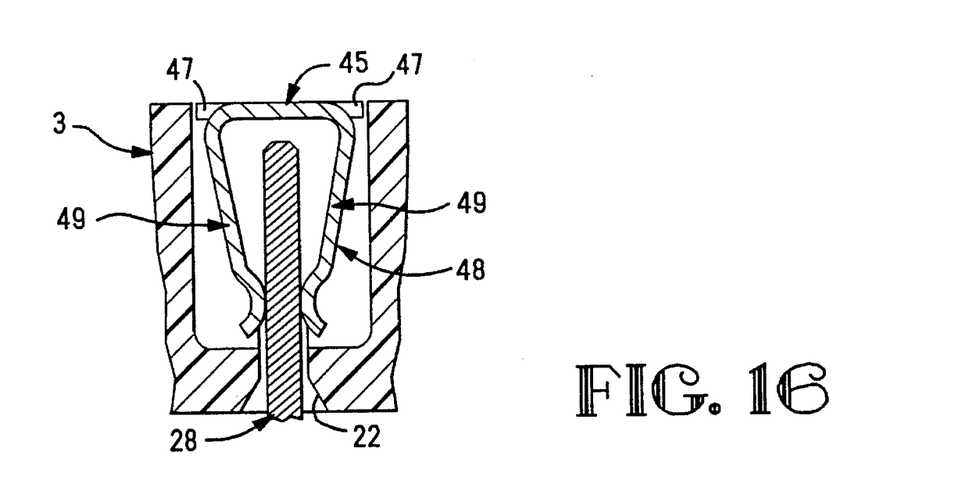
FIG. 16 is a fragmentary view in section of the battery terminal of FIG. 15 in mating connection with an electrical contact of the mating connector shown in FIG. 12.

The terminal 5, as well as each other terminal, comprises a two-sided, spring resilient, receptacle 48 FIG. 16. Each side 49 of the receptacle is a triangle, and is divided into a pair of beams 50 intersecting at an apex of the triangle. A bulged contact surface 51 at the apex engages one side of the blade of the mating connector 24. Both sides 49 of the receptacle 48 are outwardly bowed, FIG. 16, to provide a receptacle 48 with outwardly bowed open sides. These open sides are accessible to the end 19 of the package 3 and the bottom side 20 of the package 3, to receive and connect with a blade of the mating connector 24 that enters the recess 22 of the package 3 from the end 19 of the package 3 or from the open bottom side 20 of the package 3. The pair of beams 50 distribute internal strain caused by resilient deflection of the sides 49 of the receptacle 48 when one of the blades of the mating connector 24, FIGS. 13 and 16, enters one of the open sides of the receptacle 48, and wedges between, and is clamped between the contact surfaces 51 of the sides of the receptacle 48. The pair of beams reduce the stiffness in the sides to assure ease of resilient deflection when matingly connected with one of the blades.

The receptacle 48 is mounted to project diagonally in a recess 22, FIG. 13, with the spine 45 inclined along the same angle as the chamfered edge 44 of the contact 28. The chamfered edge 44 will be opposite the spine 45 when the receptacle 48 is mateably connected to the contact 28. Unlike the package 3 of FIG. 1, the package 3 of FIG. 12 is not required to pivot when connecting with the mating connector 24 of FIG. 12. The package 3 of FIG. 12 is capable of mating connection with the mating connector 24 by movement of the end 19 into the open side 38 of the mating connector 24, or by movement of the bottom side 20 into the open top 37 of the mating connector 24. Mating connection is achieved when the end 19 is overlapped by the side wall 30, and the bottom side 20 covers the base 29 of the mating connector 24.

We claim:

1. An electrical connector for an electrical source comprising: first and second pairs of electrical terminals, the first pair being connected in electrical series to the electrical source, the second pair being connected, respectively, to a positive terminal and to at least a portion of a charging control circuit, a package containing the electrical source and said portion of a charging control circuit, accessible portions of the terminals being accessible through an end of the package and also through a side of the package to engage electrical contacts of another mating electrical connector, both the end and the side of the package matingly engage another, mating electrical connector, barrier receiving recesses in the package to align with and to receive mating projecting barriers of another, mating electrical connector, and each of the terminals comprises, a central spine, and ribs extending from the spine to engage the package.

2. An electrical connector as recited in claim 1 wherein, each of the terminals comprises, a receptacle having sides that clamp on an electrical contact of another, mating electrical connector, and the spine is connected to the sides.

3. An electrical connector as recited in claim 2 wherein each of the sides on the receptacle is divided into a pair of beams intersecting at an apex.

4. An electrical connector for a battery comprising: an insulating package, recesses in an intersection of an end and a side of the package, said recesses receiving mating electrical contacts of another, mating electrical connector in the recesses, battery terminals for electrical connection with at least one battery cell, the terminals being in the recesses and being recessed from the intersection, the terminals engaging with mating electrical contacts of another, mating electrical connector received in the recesses, and each of the terminals comprises, a central spine, and ribs extending from the spine to engage the package.

5. An electrical connector as recited in claim 4 wherein, each of the terminals comprises, a receptacle having sides that clamp on a mating electrical contact of another, mating electrical connector, and the spine is connected to the sides.

6. An electrical connector for a battery comprising: an insulating package, recesses in an end and in a side of the package into which electrical contacts of another, mating electrical connector must be received for electrical connection to respective battery terminals, battery terminals in the package for electrical connection to at least one battery cell, the battery terminals being recessed within respective recesses from the end of the package and from the side of the package, barrier receiving recesses in the package to align with and to receive mating barriers of another, mating electrical connector, and each of the terminals comprises, a central spine, and ribs extending from the spine to engage the package.

7. An electrical connector as recited in claim 6 wherein, each of the terminals comprises, a receptacle having sides that clamp on an electrical contact of another, mating electrical connector, and the spine is connected to the sides.

8. An electrical connector for a battery comprising: an insulating package comprising, a base and a cover, at least one battery cell in the package, battery terminals connected electrically to said battery cell, recesses in an intersection of a side of the package and an end of the package, the recesses in the intersection receiving respective electrical contacts of another, mating electrical connector, the terminals being recessed in the recesses, the terminals connecting in the recesses with respective electrical contacts of another, mating electrical connector received in the intersection, the cover and the base being joined together enclosing said battery cell and the terminals, and each of the terminals comprises, a central spine, and ribs extending from the spine to engage the package.

9. An electrical connector as recited in claim 8 wherein, each of the terminals comprises, a receptacle having sides that clamp on an electrical contact of another, mating electrical connector, and the spine is connected to the sides.

10. An electrical connector for connection to a connector for a rechargeable battery comprising: an insulative housing block having a base for mounting on a circuit board, a side wall extending from the base, end barriers extending from the base, electrical contacts extending from the base toward an open side of the housing block and toward an open top of the housing block, the end barriers and the contacts being adapted for plugging receipt in an end and in a side of a package containing a rechargeable battery, the open top and the open side of the housing block being adapted to be covered by an end and a side of the package, and the side wall being adapted to overlap an end of the package.

11. An electrical connector as recited in claim 10 wherein each of the contacts has a base portion impinging against the base of the housing block, and the contacts have electrical terminals extending below the base of the housing block and adapted to be connected to a circuit board.

12. An electrical connector as recited in claim 10 wherein the open top adapts the connector for mating connection with a package of varied height.

13. An electrical connector as recited in claim 10 wherein coupling parts on the connector are adapted to couple with the package.

14. An electrical connector as recited in claim 10 wherein each of the contacts comprises a blade to engage mating electrical contacts in a package for a rechargeable battery.

15. An electrical connector as recited in claim 10 wherein each of the contacts comprises a resiliently deflectable portion to engage mating electrical contacts in a package for a rechargeable battery.

16. An electrical connector as recited in claim 10 wherein the end barriers are of different widths.

17. An electrical connector for connection to a connector for a rechargeable battery comprising: an insulative housing block having a base, electrical contacts extending from the base, barriers extending from the base, the barriers and the contacts projecting toward a mating connector for a rechargeable battery to plug in an end and in a side of the connector for a rechargeable battery, a side wall on the housing block adapted to overlap an end of a connector for a rechargeable battery, and the contacts extending along the side wall.

18. An electrical connector as recited in claim 17 wherein the barriers are of different widths.

19. An electrical connector as recited in claim 17, and further comprising: coupling parts on the housing block for coupling with a connector for a rechargeable battery.

20. An electrical connector as recited in claim 17 wherein each of the contacts comprises a resiliently deflectable portion.

21. An electrical connector as recited in claim 17 wherein each of the contacts comprises a blade.

22. An electrical connector as recited in claim 21 wherein each blade has a depending terminal.

23. An electrical connector on a battery, comprising:

multiple battery terminals in an outer insulating package, battery cells in the outer insulating package, the battery cells being electrically connected to the battery terminals in an interior of the outer insulating package;

the battery terminals connecting the battery cells with, and disconnecting the battery cells from, a mating electrical connector on equipment that relies on a battery for a source of electrical voltage;

recesses in an end of the outer insulating package for connection with, and disconnection from, said mating electrical connector on equipment that relies on a battery for a source of electrical voltage, the recesses being aligned with the battery terminals;

the battery cells and the battery terminals being connected with, and disconnected from, said mating electrical connector upon said recesses being connected with, and disconnected from, said mating electrical connector.

24. An electrical connector as recited in claim 23 wherein, each of the terminals is obverse curved to face toward both said end and said one of said exterior surfaces.

25. An electrical connector as recited in claim 23 wherein, portions of the terminals are embedded in the outer insulating package.

26. An electrical connector as recited in claim 23, and further comprising: a hook shaped coupling to removably hook onto another, mating electrical connector, the coupling being recessed in additional recesses in said end of the outer insulating package.

27. An electrical connector as recited in claim 23 and further comprising: a portion of a charging control circuit in the outer insulating package, the charging control circuit being connected to respective battery terminals in the interior of the outer insulating package.

28. An electrical connector as recited in claim 23 wherein each of the terminals comprises, a central spine, and ribs extending from opposite sides of the spine to engage the outer insulating package.

29. An electrical connector on a battery as recited in claim 23 wherein; said end extends between two exterior surfaces on the outer insulating package; said recesses extend through both of said exterior surfaces; and said end and at least one of said exterior surfaces being connected with, and disconnected from, said mating electrical connector upon said recesses being connected with, and disconnected from, said mating electrical connector.

30. An electrical connector on a battery, comprising:

multiple battery terminals in an outer insulating package, battery cells in the outer insulating package, the battery cells being electrically connected to the battery terminals in an interior of the outer insulating package;

the battery terminals connecting the battery cells with, and disconnecting the battery cells from, a mating electrical connector on equipment that relies on a battery for a source of electrical voltage;

recesses in an end of the outer insulating package for connection with, and disconnection from, said mating electrical connector on equipment that relies on a battery for a source of electrical voltage, the recesses being aligned with the battery terminals;

the battery cells and the battery terminals being connected with, and disconnected from, said mating electrical connector upon said recesses being connected with, and disconnected from, said mating electrical connector;

wherein, each of the terminals comprises, a central spine, ribs extending from opposite sides of the spine to engage the outer insulating package, and a receptacle having sides facing each other that clamp on an electrical contact of another, mating electrical connector, and the spine being connected to the sides.

31. An electrical connector as recited in claim 30 wherein, each of the sides of the receptacle is divided into a pair of beams intersecting at an apex.

32. An electrical connector on a battery as recited in claim 23 wherein; said end extends between two exterior surfaces on the outer insulating package; said recesses extend through at least one of said exterior surfaces; and said end and said one of said exterior surfaces being connected with, and disconnected from, said mating electrical connector upon said recesses being connected with, and disconnected from, said mating electrical connector.

33. An electrical connector as recited in claim 32 wherein, said end and said one of the exterior surfaces intersect at an intersection on the outer insulating package, the terminals are recessed from the intersection, the intersection forms ribs between the terminals preventing shorting between the terminals, and the terminals are recessed from the end and from said one of the exterior surfaces and from outside edges of the ribs.

34. An electrical connector on a battery as recited in claim 23, and further comprising: barrier receiving recesses in said end of the outer insulating package for mating with barriers on said mating electrical connector.

35. An electrical connector on a battery as recited in claim 34 wherein, said end on the outer insulating package extends between two exterior surfaces on the outer insulating package, and said barrier receiving recesses in said end communicate with at least one of said exterior surfaces.

36. An electrical connector on a battery as recited in claim 34 wherein, said barrier receiving recesses have different widths to receive barriers of different widths, to distinguish the outer insulating package from another package having dissimilar barrier receiving recesses.

37. An electrical connector on a battery as recited in claim 34 wherein, said end on the outer insulating package extends between two exterior surfaces on the outer insulating package, and said barrier receiving recesses in said end of the outer insulating package communicate with both of said exterior surfaces.

38. An electrical connector as recited in claim 34, and further comprising: a hook shaped coupling to removably hook onto mating barriers of said mating electrical connector, the coupling being recessed in the barrier receiving recesses.

* * * * *